C. H. WATKINS.
SPARKING PLUG.
APPLICATION FILED JULY 3, 1917.

1,263,719.

Patented Apr. 23, 1918.

Inventor:
Chas. Horace Watkins
Atty:
B. Singer.

UNITED STATES PATENT OFFICE.

CHARLES HORACE WATKINS, OF CARDIFF, WALES.

SPARKING PLUG.

1,263,719.  Specification of Letters Patent.  Patented Apr. 23, 1918.

Application filed July 3, 1917. Serial No. 178,480.

*To all whom it may concern:*

Be it known that I, CHARLES HORACE WATKINS, a subject of the King of Great Britain, and resident of Cardiff, Wales, have invented certain new and useful Improvements in Sparking Plugs, of which the following is a specification.

This invention relates to improvements in or connected with sparking plugs of the kind whose inner insulating member is surrounded at its upper end by an outer insulation and is separated from the central electrode carrying pin by an air gap. The invention has for its object to provide a sparking plug of the aforesaid kind which shall be stronger and less liable to breakage and more efficient in use than the sparking plugs used hitherto.

The invention consists of a particular construction the primary feature of which is that the inner insulating member is clamped by an inner nut to the central pin and by an outer annular nut to an outer metal casing, a concave washer preferably being interposed, and this inner insulating member is surrounded at its upper end by an outer annular insulation held in position by a clamping nut and is separated from the central carrying pin by an air gap. The outer insulation aforesaid preferably consists of a number of superimposed annular washers of mica or the like, and the inner insulation is provided with a flange which is supported upon a shoulder formed in the outer metal casing, a copper washer being preferably interposed between the flange on the insulation and the shoulder within the casing. A plug of the foregoing construction will be found to be very strong and durable and not liable to be fractured or disarranged when employed in rotary engines such as the Gnome type where the strains due to centrifugal force are very considerable and moreover such plugs will not be liable to fracture as a result of heat stresses.

The construction of the various parts is such that as short a plug as possible is produced consistent with efficiency, and at the same time any liability of the oil to percolate through from the engine cylinder, so causing short-circuiting, is effectively prevented.

In order that the invention may be more readily understood and carried into practice, reference is hereby made to the accompanying drawings wherein:—

Figure 2:
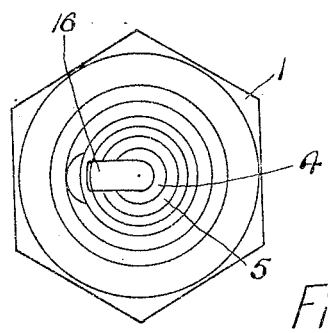
Figure 1:
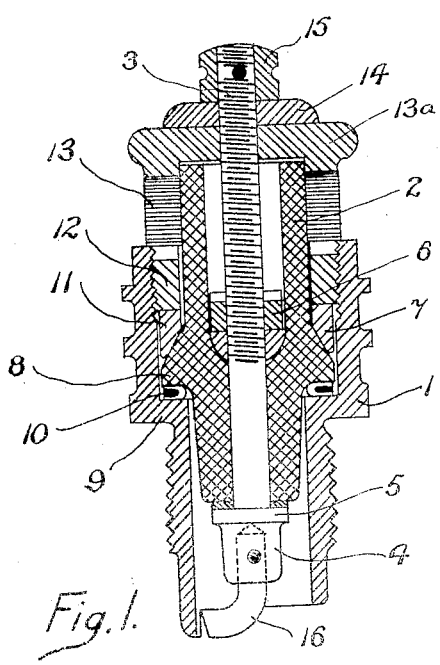

Figure 1 is a section of a sparking plug.
Fig. 2 is an underneath plan of Fig. 1.

Referring to these drawings the numeral 1 designates a hollow metal base piece of usual form and threaded to screw into the engine cylinder. Centrally of this base piece but projecting above it, is a porcelain or other insulating member 2 with a central bore the upper portion of which is enlarged. This central bore is adapted to take a center pin 3 which coincides in size with the narrow part of the bore. The greater part of the pin 3 is threaded, and is provided with an enlarged end 4 having a flange 5 which bears against the lower end of the insulating member 2, a jointing or copper washer being preferably interposed. The pin 3 is locked within the porcelain member by means of a nut 6 which lies within the enlarged part of the bore of the insulating member at a depth sufficient to leave an appreciable air space between the member 2 and pin 3 and rests upon a washer 7, preferably of aluminium, which fits into the base of the enlarged part of the bore. This washer 7 is slipped on the pin 3 before screwing up the clamping nut 6. The insulating member 2 has a flange 8 which rests upon an annular flange 9 within the base piece 1, a washer 10, which may be of copper asbestos, being interposed. A washer 11, which may be of aluminium, rests upon the upper side of the flange 8 and the whole is then locked in position by means of a collar 12 which screws into an internal thread on the member 1.

The outer insulating member 13 is preferably built up in known manner of thin mica or similar washers which can be threaded on to that portion of the inner insulating member 2 which projects above the member 1. The bottom mica, or like, washer rests on top of the base piece 1 or upon the screwed collar 12 located within the upper end of the base piece and is surmounted by a washer 13$^a$ of some insulating material such as fiber having an annular flange which is concentric with the mica washers. The bore of this washer 13$^a$ embraces the pin 3, and the washer is maintained in position by means of screwed washer 14 and a lock-nut 15 which are both threaded on to the end of the pin 3. By these means the projecting end of the insulating member 2 is completely surrounded by insulation and kept from contact with the atmosphere.

The electrode 16 is screwed or attached to the enlarged end of the pin 2 and is provided with a diagonal or angular point. The taper shape of the spark gap thus formed causes any oil or foreign matter that may collect at the spark gap to be more readily dispersed by the action of the centrifugal force set up when the engine is working and moreover this form of spark gap confers the additional advantages of easy starting and slow running.

What I claim and desire to secure by Letters Patent is:—

A sparking plug comprising a central screw-threaded pin carrying the electrode, a hollow porcelain or other insulating member surrounding the pin, an enlarged cylindrical recess in the upper end of this insulating member forming an air gap between the central pin and the insulating member, the lower end of which recess forms a seating for a washer upon which a securing nut bears, an outer metal casing housing the lower end of the inner insulating member, an annular washer located between the insulating member and the outer metal casing, an annular nut engaging internal screw threads in the upper end of the outer metal casing and serving to secure the inner insulating member in position in the metal casing, an annular outer insulation surrounding the upper end of the inner insulating member, an insulating washer having an annular flange adapted to rest upon the annular outer insulating member, a screwed clamping washer bearing upon the flanged washer and a lock nut engaging said clamping washer, substantially as specified.

In testimony whereof I affix my signature.

CHARLES HORACE WATKINS.